(12) United States Patent
Huang

(10) Patent No.: US 10,948,808 B2
(45) Date of Patent: Mar. 16, 2021

(54) OPTICAL MODULE AND PROJECTOR

(71) Applicant: Coretronic Corporation, Hsin-Chu (TW)

(72) Inventor: Shou-Cheng Huang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/842,781

(22) Filed: Apr. 8, 2020

(65) Prior Publication Data
US 2020/0326613 A1   Oct. 15, 2020

(30) Foreign Application Priority Data
Apr. 10, 2019 (CN) .......................... 201910283545.0

(51) Int. Cl.
    G03B 21/14    (2006.01)
    H04N 9/31     (2006.01)
    G02B 7/00     (2021.01)
    G03B 21/20    (2006.01)

(52) U.S. Cl.
    CPC .......... *G03B 21/142* (2013.01); *G02B 7/003* (2013.01); *G03B 21/2066* (2013.01); *H04N 9/3141* (2013.01)

(58) Field of Classification Search
    CPC .... G03B 21/142; G03B 21/145; G03B 21/14; H04N 9/3141; G02B 7/003; G02B 7/004; G02B 7/005; G02B 7/023
    See application file for complete search history.

(56) References Cited

U.S. PATENT DOCUMENTS

2017/0227838 A1* 8/2017 Saegusa ............... G03B 21/208

FOREIGN PATENT DOCUMENTS

CN          102135710         7/2011

* cited by examiner

*Primary Examiner* — Ryan D Howard
(74) *Attorney, Agent, or Firm* — JCIPRNET

(57) ABSTRACT

An optical module including a first frame body, a second frame body, an adjusting member and an optical element is provided. The first frame body is rotatably connected to a base body along a first axis, the first frame body has a first adjusting portion, and the first adjusting portion drives the first frame body to rotate along the first axis. The second frame body is rotatably connected to the first frame body along a second axis, the second frame body has a second adjusting portion. The adjusting member is screwed to the first adjusting portion, and the adjusting member moves along the first axis relative to the first adjusting portion, so as to push the second adjusting portion to drive the second frame body to rotate along the second axis. The optical element is disposed on the second frame body. Moreover, a projector having the optical module is provided.

20 Claims, 7 Drawing Sheets

OPTICAL MODULE AND PROJECTOR

CROSS-REFERENCE TO RELATED APPLICATION

This application claims the priority benefit of China application serial no. 201910283545.0, filed on Apr. 10, 2019. The entirety of the above-mentioned patent application is hereby incorporated by reference herein and made a part of this specification.

BACKGROUND

Technical Field

The invention relates to an optical module and a projector, and particularly relates to an optical module and a projector capable of adjusting a rotation angle of an optical element.

Description of Related Art

Projector is a display device for generating large-scale images. An imaging principle of the projector is to use a light valve to convert an illumination light beam produced by a light source into an image light beam, and then project the image light beam onto a screen or a wall by a projection lens.

Generally, the illumination light beam and the image light beam are required to be guided by various optical elements of an optical module in the projector to transmit along a predetermined transmission path. When the projector is out of the manufacturing factory, it is necessary to adjust the optical elements in the projector to an accurate angle in order to achieve a good projection effect. Moreover, vibration may occur during a use or moving process of the projector, which may inevitably cause angle deviation of the optical elements, resulting in a fact that the illumination light beam and the image light beam may deviate from the predetermined transmission path. Therefore, the optical module in the projector should be equipped with a corresponding adjusting mechanism in order to facilitate before shipment adjustment and subsequent maintenance, so that the optical elements may return to the correct angle. Along with a trend of miniaturization of the projectors and the requirement of high quality projection, how to precisely adjust the rotation angle of the optical elements by means of a simplified adjusting mechanism is an important issue in the design of the adjusting mechanism.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to an optical module and a projector, which is capable of precisely adjusting a rotation angle of an optical element through a simplified adjusting mechanism.

Other objects and advantages of the invention may be further illustrated by the technical features broadly embodied and described as follows.

In order to achieve one or a portion of or all of the objects or other objects, an embodiment of the invention provides an optical module including a first frame body, a second frame body, an adjusting member and an optical element. The first frame body is rotatably connected to a base body along a first axis, the first frame body has a first adjusting portion, and the first adjusting portion is configured to drive the first frame body to rotate along the first axis. The second frame body is rotatably connected to the first frame body along a second axis, the second frame body has a second adjusting portion. The adjusting member is screwed to the first adjusting portion, and the adjusting member is adapted to move along the first axis relative to the first adjusting portion, so as to push the second adjusting portion to drive the second frame body to rotate along the second axis. The optical element is disposed on the second frame body.

In order to achieve one or a portion of or all of the objects or other objects, an embodiment of the invention provides a projector including a light source, a light valve, a projection lens and an optical module. The light source is configured to provide an illumination light beam. The light valve is disposed on a transmission path of the illumination light beam, and is configured to convert the illumination light beam into an image light beam. The projection lens is disposed on a transmission path of the image light beam, and is configured to project the image light beam out of the projector. The optical module includes a first frame body, a second frame body, an adjusting member and an optical element. The first frame body is rotatably connected to a base body along a first axis, the first frame body has a first adjusting portion, and the first adjusting portion is configured to drive the first frame body to rotate along the first axis. The second frame body is rotatably connected to the first frame body along a second axis, the second frame body has a second adjusting portion. The adjusting member is screwed to the first adjusting portion, and the adjusting member is adapted to move along the first axis relative to the first adjusting portion, so as to push the second adjusting portion to drive the second frame body to rotate along the second axis. The optical element is disposed on the second frame body and is located on the transmission path of the illumination light beam.

Based on the above description, the embodiments of the invention have at least one of following advantages or effects. In the optical module of the embodiments of the invention, besides that the first adjusting portion of the first frame body is configured to drive the first frame body to rotate along the first axis, the first adjusting portion is further screwed to the adjusting member, so that the adjusting member may drive the second frame body to rotate along the second axis through moving of the adjusting member relative to the first adjusting portion. Namely, the optical module integrates an adjusting operation of the first axis and an adjusting operation of the second axis to the first adjusting portion, so as to simplify an overall structure of the optical module, and accordingly save a configuration space in the projector. Moreover, a maker may complete the adjusting operation of the first axis and the adjusting operation of the second axis by operating the adjusting member and the first adjusting portion from a single side of the projector only, thereby making the adjustment more convenient.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
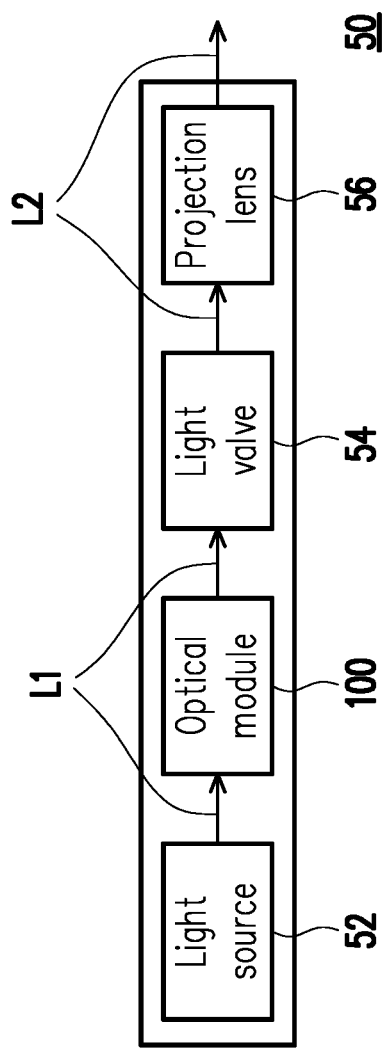
FIG. 1 is a schematic diagram of a projector according to an embodiment of the invention.

FIG. 1 is a schematic diagram of a projector according to an embodiment of the invention. Referring to FIG. 1, the projector 50 of the embodiment includes a light source 52, a light valve 54 and a projection lens 56. The light source 52 is configured to provide an illumination light beam L1. The light valve 54 is disposed on a transmission path of the illumination light beam L1, and is configured to convert the illumination light beam L1 into an image light beam L2. The projection lens 56 is disposed on a transmission path of the image light beam L2, and is configured to project the image light beam L2 out of the projector 50. Moreover, the projector 50 further includes an optical module 100, and the optical module 100 is disposed on the transmission path of the illumination light beam L1. In other embodiments, the optical module 100 may also be disposed on the transmission path of the image light beam L2, which is not limited by the invention.

Figure 2:
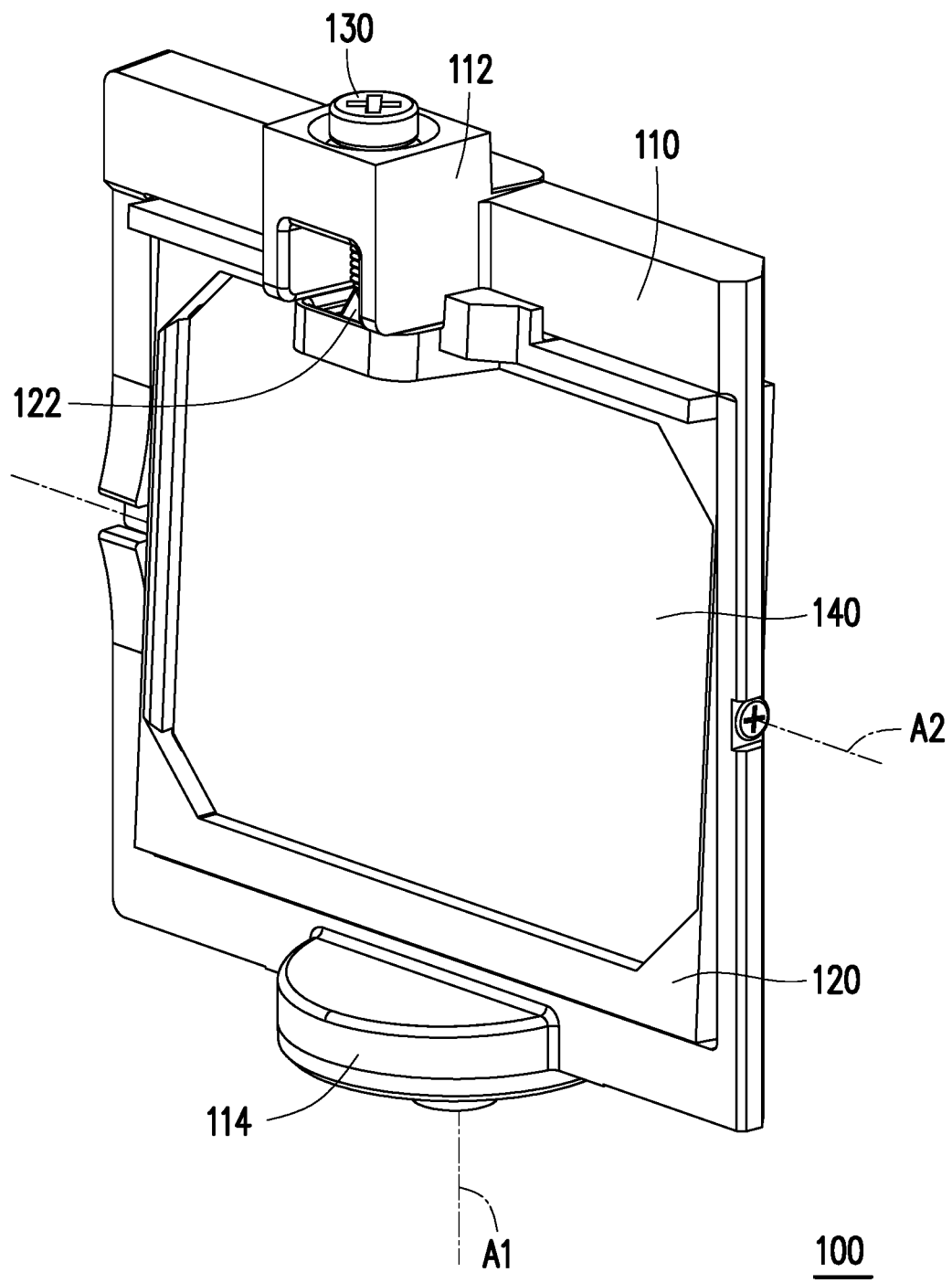
FIG. 2 is a three-dimensional view of an optical module of FIG. 1.

FIG. 2 is a three-dimensional view of the optical module of FIG. 1. Referring to FIG. 2, the optical module 100 includes a first frame body 110, a second frame body 120, an adjusting member 130 and an optical element 140. The first frame body 110 is rotatably connected to a base body (not shown) along a first axis A1 through a pivot portion 114 thereof, where the base body may be a casing of the projector 50 or other proper fixing structure fixed in the projector 50, which is not limited by the invention. The first frame body 110 has a first adjusting portion 112, and the first adjusting portion 112 is configured to bond with a fixture, and drives the first frame body 110 to rotate along the first axis A1 through a force exerted by the fixture, where the fixture is, for example, an appliance that applies the force to the first adjusting portion 112 in a manner of clamping or adjusting the first adjustment portion 112, but the invention is not limited thereto. In another embodiment, the adjusting portion 112 includes a clamping structure (not shown) at a position where the first axis A1 passes through, and the clamping structure is used for clamping with a specific fixture, and the maker may rotate the specific fixture/tool to drive the first frame body 110 to rotate along the first axis A1, and the clamping structure is, for example, a flat or a cross groove, while the specific fixture/tool is, for example, a screwdriver, but the shape of the clamping structure is not limited thereto.

Figure 3A:
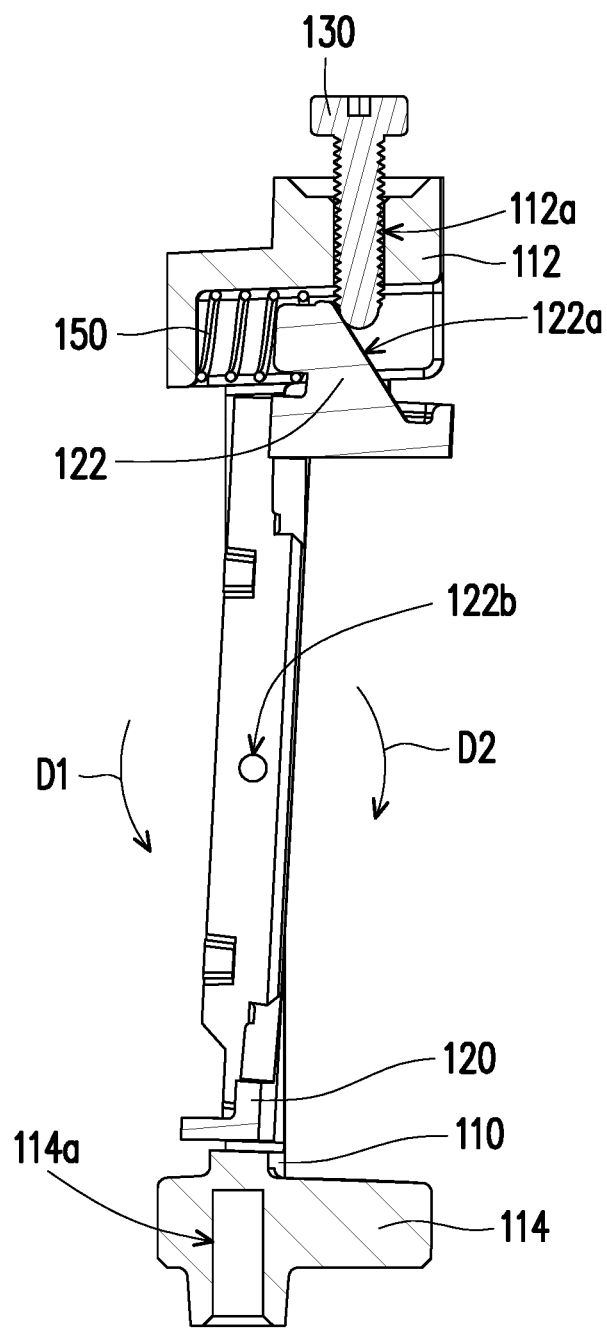
FIG. 3A and FIG. 3B illustrate partial structure of the optical module.
Figure 3B:
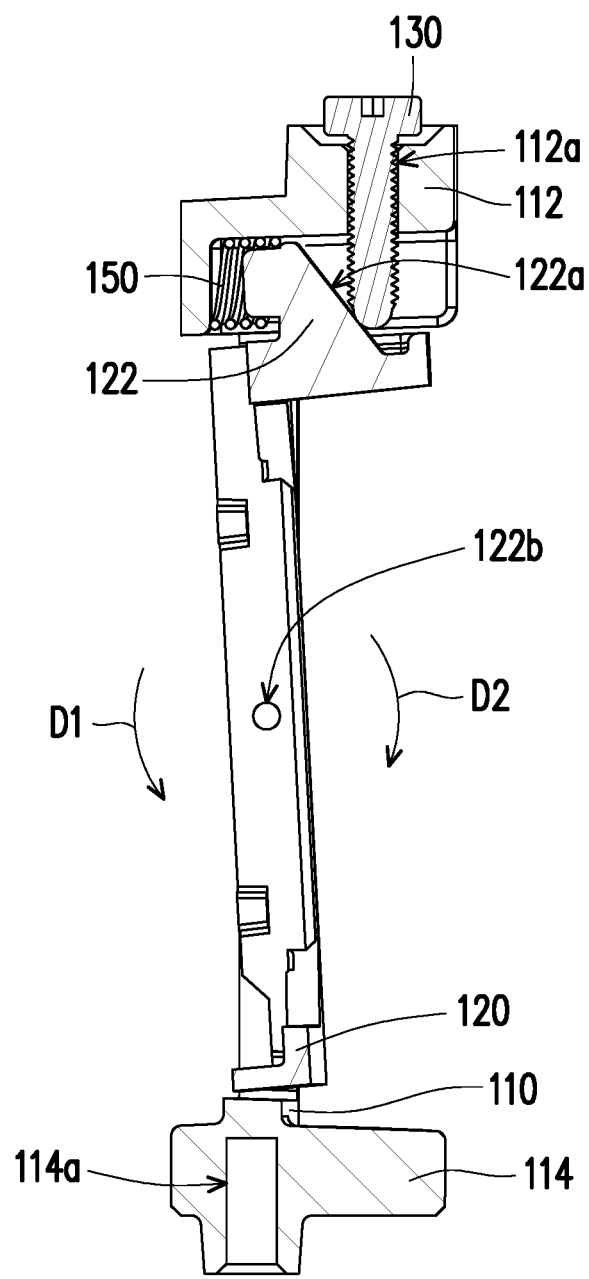

The adjusting member 130 is, for example, a screw and is screwed to the first adjusting portion 112 through a screwed through hole 112a. Moreover, the second frame body 120 is rotatably connected to the first frame body 110 along a second axis perpendicular to the first axis A1, and the second frame body 120 has a second adjusting portion 122. FIG. 3A and FIG. 3B illustrate movement of the adjustment member of FIG. 2. For clarity's sake, FIG. 3A and FIG. 3B only illustrate partial structures of the optical module 100. A maker may rotate the adjusting member 130 by a tool (for example, a screwdriver), so that the adjusting member 130 is moved from a position shown in FIG. 3A to a position shown in FIG. 3B relative to the first adjusting portion 112 along a direction parallel to the first axis A1, so as to push the second adjusting portion 122 to drive the second frame body 120 to rotate along the second axis A2. In an embodiment, the optical module 100 may be disposed on the transmission path of the illumination light beam L1, and the optical element 140 included in the optical module 100 is, for example, a dichroic mirror, which is disposed on the optical element 140 of the second frame body 120, and is located on the transmission path of the illumination light beam L1. In other embodiments, the optical element 140 may be other types of transparent element or reflection element, and may be located on the transmission path of the illumination light beam L1, which is not limited by the invention.

In other embodiments, the clamping structure of the adjusting portion 112 located at the position where the first axis A1 passes through may have a same groove with that on the adjusting member 130, and the maker may use the same fixture/tool at a same side of the optical element 140 to adjust rotation angles of the optical element 140 along the first axis A1 and the second axis A2.

Under the above configuration, besides that the first adjusting portion 112 of the first frame body 110 is configured to drive the first frame body 110 to rotate along the first axis A1, the first adjusting portion 112 is further screwed to the adjusting member 130, so that the adjusting member 130 may drive the second frame body 120 to rotate along the second axis A2 through moving of the adjusting member 130 relative to the first adjusting portion 112. Namely, the optical module 100 integrates an adjusting operation of the first axis A1 and an adjusting operation of the second axis A2 to the first adjusting portion 112, so as to simplify an overall structure of the optical module 100, and accordingly save a configuration space in the projector 50 and reduce a manufacturing assembly cost. Moreover, the maker may complete the adjusting operation of the first axis A1 and the adjusting operation of the second axis A2 by operating the adjusting member 130 and the first adjusting portion 112 from a single side of the projector 50 only, thereby making the adjustment more convenient. Particularly, a plurality of heat dissipation structures such as fans are generally configured at the side of the optical module 100, and in configuration of a conventional adjusting structure, adjustment of a different axis is required to be performed at a different side of the optical module 100, so that in addition to difficulty in adjustment, there are more restrictions on design of the configuration of the heat dissipation structure.

In other embodiments, the fixture may be used to apply a force to the pivot portion 114 of the first frame body 110 to drive the first frame body 110 to rotate along the first axis A1, but the invention is not limited thereto. The pivot portion 114 may includes the fixture, and the fixture is, for example, a positioning post, and the positioning post is inserted into an adjusting hole 114a of the pivot portion 114, such that the positioning post is rotatably combined to the pivot portion 114.

To be specific, as shown in FIG. 3A and FIG. 3B, the optical module 100 of the embodiment further includes an elastic member 150, and the elastic member 150 is, for example, a compression spring, a reed, an elastic gasket, etc., which may leans against an inner surface of the first adjusting portion 112 to provide an elastic force to the second adjusting portion 122, and is disposed between the first frame body 110 and the second frame body 120, where the elastic member 150 and the adjusting member 130 respectively lean against two opposite sides of the second adjusting portion 122 to limit a moving range of the second adjusting portion 122. When the adjusting member 130 is moved from the position shown in FIG. 3A to the position shown in FIG. 3B, the adjusting member 130 may resist the elastic force of the elastic member 150 to drive the second frame body 120 to rotate along a first rotation direction D1. When the adjusting member 130 is moved from the position shown in FIG. 3B to the position shown in FIG. 3A, the second frame body 120 may be restored along a second rotation direction D2 opposite to the first rotation direction D1 through the elastic force of the elastic member 150. In an embodiment, a direction in which the elastic member 150 provides the elastic force is perpendicular to a moving direction of the adjusting member 130.

Further, in the embodiment, the second adjusting portion 122 has a slope 122a, which is inclined relative to the first axis A1. The first adjusting portion 112 has the screwed through hole 112a, the adjusting member 130 is screwed to the screwed through hole 112a, and is protruded out of the screwed through hole 112a to lean against the slope 122a of the second adjusting portion 122. When the adjusting member 130 is moved along a direction parallel with the first axis A1, the adjusting member 130 pushes the slope 122a of the second adjusting portion 122 to drive the second adjusting portion 122 to rotate. By designing a proper inclining angle of the slope 122a of the second adjusting portion 122, an effect of accurately fine-tuning a rotation angle of the second frame body 120 may be achieved.

The second frame body 120 of the embodiment has at least one shaft portion 122b, and is pivotally connected to the first frame body 110 along the second axis A2 through the shaft portions 122b. The shaft portions 122b are, for example, shaft holes, and the number thereof is, for example, two, and the shaft holes are respectively located at two opposite sides of the second frame body 120, and located on the second axis A2. In other embodiment, the type, number and configuration position of the shaft portions 122b may be varied according to an actual requirement, which is not limited by the invention. In the embodiment, the first axis A1 and the second axis A2, for example, all pass through a geometric center of the optical element 140, so that the geometric center of the optical element 140 is not shifted during the aforementioned adjusting process, so as to maintain good light-emitting efficiency and imaging quality.

Figure 4:
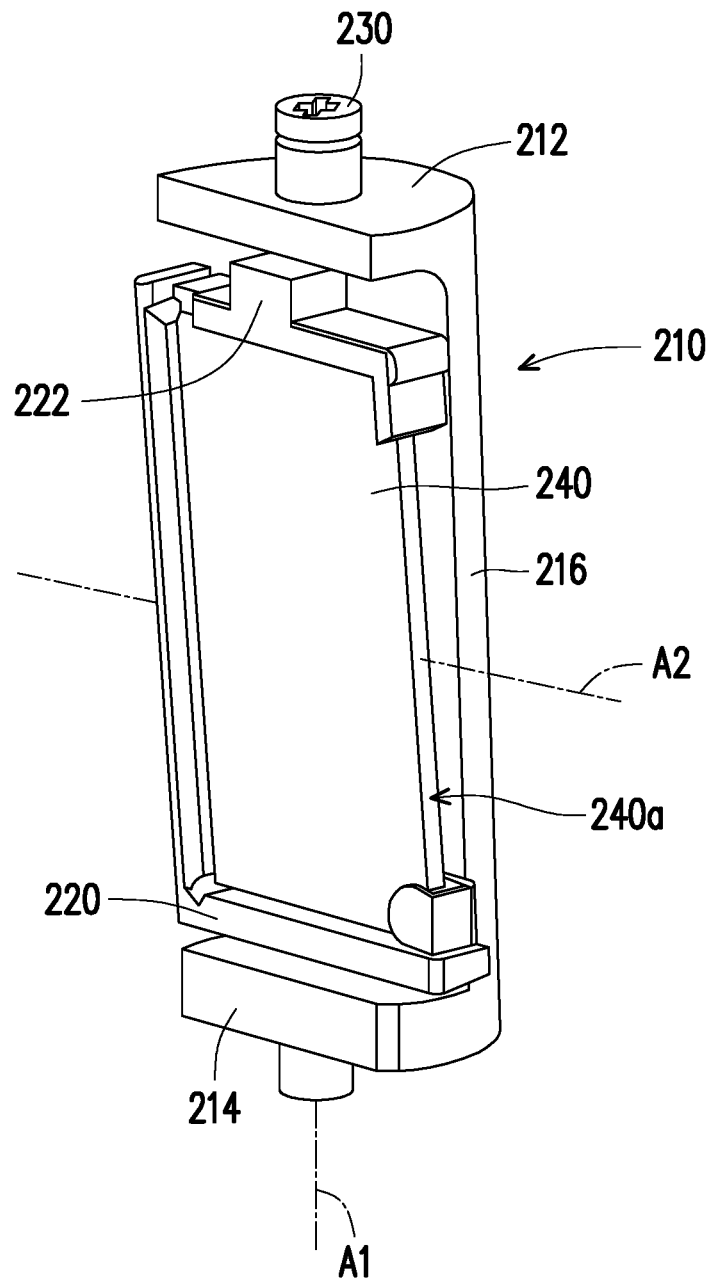
FIG. 4 is a three-dimensional view of an optical module according to another embodiment of the invention.
Figure 5A:
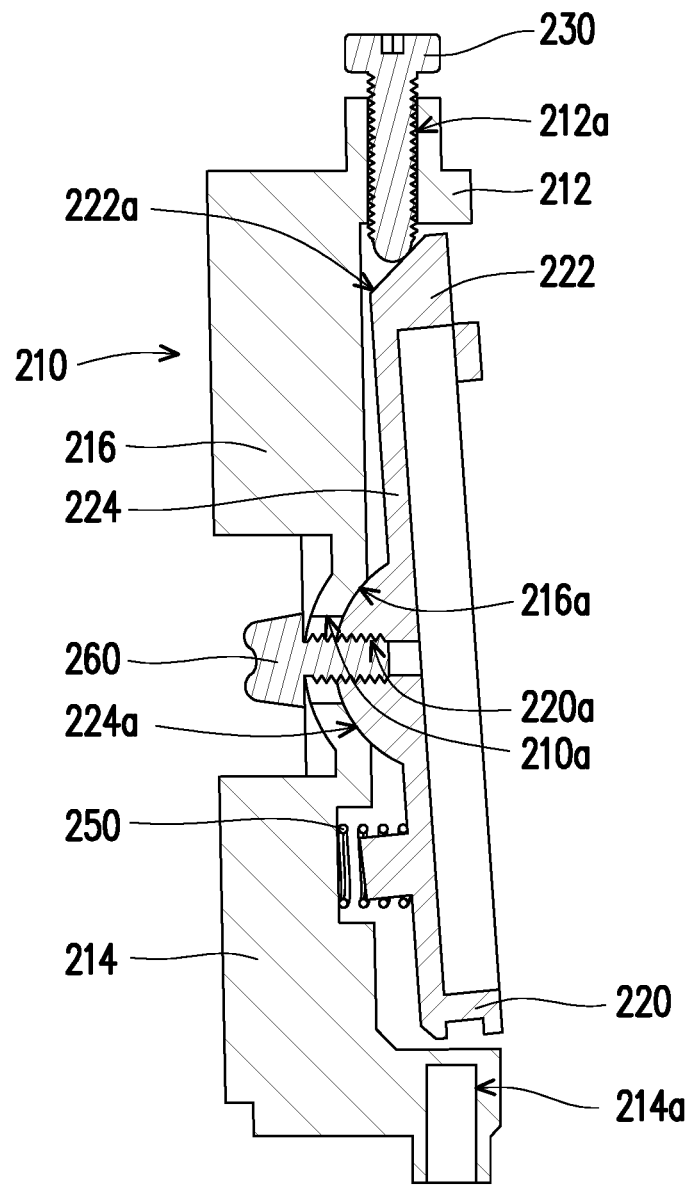
FIG. 5A and FIG. 5B illustrate moving of an adjusting member of FIG. 4.
Figure 5B:
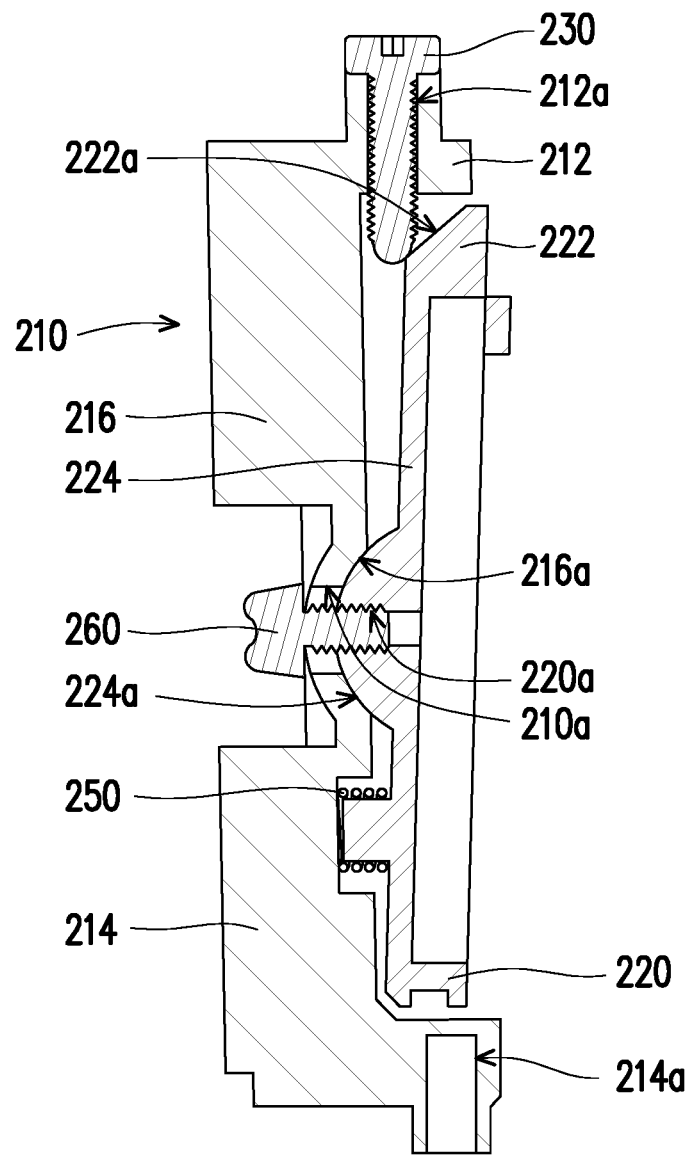

FIG. 4 is a three-dimensional view of an optical module according to another embodiment of the invention. FIG. 5A and FIG. 5B illustrate moving of an adjusting member of FIG. 4. In the optical module 200 shown in FIG. 4, FIG. 5A and FIG. 5B, configurations and functions of a first frame body 210, a first adjusting portion 212, a screwed through hole 212a, a pivot portion 214, an adjusting hole 214a, a second frame body 220, a second adjusting portion 222, a slop 222a, an adjusting member 230, an optical element 240 and an elastic member 250 are similar to the configurations and the functions of the first frame body 110, the first adjusting portion 112, the screwed through hole 112a, the pivot portion 114, the adjusting hole 114a, the second frame body 120, the second adjusting portion 122, the slop 122a, the adjusting member 130, the optical element 140 and the elastic member 150 of the aforementioned embodiment, and details thereof are not repeated.

A difference between the optical module 200 and the optical module 100 is that the optical element 240 is, for example, a reflection element, and light does not need to penetrate through the optical element 240, so that the first frame body 210 and the second frame body 220 may respectively have a first back plate portion 216 and a second back plate portion 224. The second back plate portion 224 covers a back surface of the optical element 240, and the elastic member 250 is disposed between the second back plate portion 224 and the first frame body 210. The mutual stop of the second back plate portion 224 and the first back plate portion 216 may limit a moving range of the second back plate portion 224 and the second adjusting portion 222 thereof.

Moreover, the first back plate portion 216 has a concave curved surface 216a, and the second back plate portion 224 has a convex curved surface 224a, the convex curved surface 224a and the concave curved surface 216a are jointed to each other, and the second frame body 220 is rotated along with relative sliding between the convex curved surface 224a and the concave curved surface 216a. Namely, the second frame body 220 is rotatably connected to the first frame body 210 along the second axis A2 through matching of the convex curved surface 224a and the concave curved surface 216a other than the situation that the second frame body 120 is pivotally connected to the first frame body 110 along the second axis A2 through the shaft portion 122b in the aforementioned embodiment.

Furthermore, in the embodiment, the optical module 200 further includes a lock member 260. The first frame body 210 has an opening 210a, the second frame body 220 has a lock hole 220a, the opening 210a is aligned with the concave curved surface 216a, and the lock hole 220a is aligned with the convex curved surface 224a. The lock member 260 penetrates through the opening 210a and is screwed to the lock hole 220a to limit the second frame body 220 to be inseparable from the first frame body 210. The opening 210a is, for example, in form of a long-groove and an extending direction of the long groove is parallel to the first axis A1, and an aperture of the long-groove opening 210a in the extending direction is greater than an aperture of the lock hole 220a, such that the second frame body 220 and the lock member 260 have a sufficient degree of freedom to rotate relative to the first frame body 210 in a direction parallel to the extending direction of the first axis A1. In the embodiment, the convex curved surface 224a, the concave curved surface 216a, the opening 210a, the lock hole 220a and the lock member 260 are aligned to a geometric center of the optical element 240, such that the second axis A2 of the embodiment may pass through the geometric center of the optical element 240 as that does of the second axis A2 of the aforementioned embodiment. To be specific, convex curved surface 224a and the concave curved surface 216a are, for example, partial cylindrical surfaces having a same radius of curvature, and the centers of curvature of the convex curved surface 224a and the concave curved surface 216a are located at the geometric center of the optical element 240. In other embodiments, the convex curved surface 224a and the concave curved surface 216a are, for example, partial spherical shapes having a same radius of curvature, and spherical centers of the convex curved surface 224a and the concave curved surface 216a are located at the geometric center of the optical element 240.

On the other hand, in the embodiment, since the second frame body 220 is connected to the first frame body 210 through the second back plate 224 instead of being connected to the first frame body 210 through a border, the second frame body 220 may omit a part of the border as shown in FIG. 4, and the first frame body 210 may also omit a part of the border to expose at least one side 240a of the optical element 240. In this way, other optical paths in the projector may pass by the side 240a of the optical element 240 to enhance the flexibility of the optical path design and also reduce the possibility of shielding the optical paths. In other embodiments, the second frame body 220 may only retain a frame including one side of the inclined surface 222a, which may effectively reduce a volume of the adjustment structure.

In summary, the embodiments of the invention have at least one of following advantages or effects. In the optical module of the embodiments of the invention, besides that the first adjusting portion of the first frame body is configured to drive the first frame body to rotate along the first axis, the first adjusting portion is further screwed to the adjusting member, so that the adjusting member may drive the second frame body to rotate along the second axis through moving of the adjusting member relative to the first adjusting portion. Namely, the optical module integrates an adjusting operation of the first axis and an adjusting operation of the second axis to the first adjusting portion, so as to simplify an overall structure of the optical module, and accordingly save a configuration space in the projector. Moreover, the maker may complete the adjusting operation of the first axis and the adjusting operation of the second axis by operating the adjusting member and the first adjusting portion from a single side of the projector only, thereby making the adjustment more convenient. In addition, since the slope of the second adjusting portion is adapted to be pushed by the adjusting member, the slope of the second adjusting portion may be designed to have a proper inclining angle to achieve an effect of accurately fine-tuning the rotation angle of the second frame body. Moreover, the first axis and the second axis may all pass through the geometric center of the optical element, so that the geometric center of the optical element is not shifted during the aforementioned adjusting process, so as to maintain good light-emitting efficiency and imaging quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims. Furthermore, the terms such as the first rotation direction, the second rotation direction, the first axis the second axis, the first frame body, the second frame body, the first second frame body, the second corner end, the first adjusting portion, and the second adjusting portion are only used for distinguishing various elements and do not limit the number of the elements.

What is claimed is:

1. An optical module, comprising:
a first frame body, rotatably connected to a base body along a first axis, wherein the first frame body has a first adjusting portion, and the first adjusting portion is configured to drive the first frame body to rotate along the first axis;
a second frame body, rotatably connected to the first frame body along a second axis, wherein the second frame body has a second adjusting portion;
an adjusting member, screwed to the first adjusting portion, wherein the adjusting member is adapted to move along the first axis relative to the first adjusting portion, so as to push the second adjusting portion to drive the second frame body to rotate along the second axis; and
an optical element, disposed on the second frame body.

2. The optical module as claimed in claim 1, wherein the first adjusting portion has a screwed through hole, the adjusting member is screwed to the screwed through hole and is protruded out of the screwed through hole to lean against the second adjusting portion.

3. The optical module as claimed in claim 1, wherein the second adjusting portion has a slope, the slope is inclined relative to the first axis, and the adjusting member moves along the first axis to push the slope.

4. The optical module as claimed in claim 1, wherein the second frame body has at least one shaft portion and is pivotally connected to the first frame body along the second axis through the at least one shaft portion.

5. The optical module as claimed in claim 1, wherein the first frame body has a first back plate portion, the second frame body has a second back plate portion, the second back plate portion covers a back surface of the optical element, the first back plate portion has a concave curved surface, and the second back plate portion has a convex curved surface, the convex curved surface and the concave curved surface are jointed to each other, and the second frame body is rotated along with relative sliding between the convex curved surface and the concave curved surface.

6. The optical module as claimed in claim 5, further comprising a lock member, wherein the first frame body has an opening, the second frame body has a lock hole, the opening is aligned with the concave curved surface, the lock hole is aligned with the convex curved surface, the lock member penetrates through the opening and is screwed to the lock hole, and an aperture of the opening is greater than an aperture of the lock hole.

7. The optical module as claimed in claim 1, further comprising an elastic member, wherein the elastic member is disposed between the first frame body and the second frame body, the adjusting member is configured to drive the second frame body to rotate in a first rotation direction, the second frame body is restored in a second rotation direction opposite to the first rotation direction through an elastic force of the elastic member.

8. The optical module as claimed in claim 7, wherein the elastic member and the adjusting member respectively lean against two opposite sides of the second adjusting portion.

9. The optical module as claimed in claim 7, wherein the second frame body has a back plate portion, the back plate portion covers a back surface of the optical element, and the elastic member is disposed between the back plate portion and the first frame body.

10. The optical module as claimed in claim 1, wherein the second frame body exposes at least one side of the optical element.

11. A projector, comprising:
a light source, configured to provide an illumination light beam;
a light valve, disposed on a transmission path of the illumination light beam, and configured to convert the illumination light beam into an image light beam;
a projection lens, disposed on a transmission path of the image light beam, and configured to project the image light beam out of the projector; and
an optical module, comprising:
a first frame body, rotatably connected to a base body along a first axis, wherein the first frame body has a first adjusting portion, and the first adjusting portion is configured to drive the first frame body to rotate along the first axis;
a second frame body, rotatably connected to the first frame body along a second axis, wherein the second frame body has a second adjusting portion;
an adjusting member, screwed to the first adjusting portion, wherein the adjusting member is adapted to move along the first axis relative to the first adjusting portion, so as to push the second adjusting portion to drive the second frame body to rotate along the second axis; and
an optical element, disposed on the second frame body and located on the transmission path of the illumination light beam.

12. The projector as claimed in claim 11, wherein the first adjusting portion has a screwed through hole, the adjusting member is screwed to the screwed through hole, and is protruded out of the screwed through hole to lean against the second adjusting portion.

13. The projector as claimed in claim 11, wherein the second adjusting portion has a slope, the slope is inclined relative to the first axis, and the adjusting member moves along the first axis to push the slope.

14. The projector as claimed in claim 11, wherein the second frame body has at least one shaft portion, and is pivotally connected to the first frame body along the second axis through the at least one shaft portion.

15. The projector as claimed in claim 11, wherein the first frame body has a first back plate portion, the second frame body has a second back plate portion, the second back plate portion covers a back surface of the optical element, the first back plate portion has a concave curved surface, and the second back plate portion has a convex curved surface, the convex curved surface and the concave curved surface are jointed to each other, and the second frame body is rotated along with relative sliding between the convex curved surface and the concave curved surface.

16. The projector as claimed in claim 15, wherein the optical module further comprises a lock member, the first frame body has an opening, the second frame body has a lock hole, the opening is aligned with the concave curved surface, the lock hole is aligned with the convex curved surface, the lock member penetrates through the opening and is screwed to the lock hole, and an aperture of the opening is greater than an aperture of the lock hole.

17. The projector as claimed in claim 11, wherein the optical module further comprises an elastic member, the elastic member is disposed between the first frame body and the second frame body, the adjusting member is configured to drive the second frame body to rotate in a first rotation direction, the second frame body is restored in a second rotation direction opposite to the first rotation direction through an elastic force of the elastic member.

18. The projector as claimed in claim 17, wherein the elastic member and the adjusting member respectively lean against two opposite sides of the second adjusting portion.

19. The projector as claimed in claim 17, wherein the second frame body has a back plate portion, the back plate portion covers a back surface of the optical element, and the elastic member is disposed between the back plate portion and the first frame body.

20. The projector as claimed in claim 11, wherein the second frame body exposes at least one side of the optical element.

* * * * *